United States Patent [19]

Tsuzuki

[11] Patent Number: 4,650,202
[45] Date of Patent: Mar. 17, 1987

[54] POWER TRANSMISSION FOR FOUR-WHEEL DRIVE VEHICLE

[75] Inventor: Isao Tsuzuki, Toyota, Japan

[73] Assignee: Toyota Jidosha Kabushiki Kaisha, Japan

[21] Appl. No.: 788,167

[22] Filed: Oct. 16, 1985

[30] Foreign Application Priority Data

Oct. 16, 1985 [JP] Japan .................. 59-218060

[51] Int. Cl.$^4$ ........................................... B60K 17/346
[52] U.S. Cl. ....................................... 280/248; 74/714
[58] Field of Search ............... 180/248, 249, 250, 233; 74/710, 714, 750 R

[56] References Cited

U.S. PATENT DOCUMENTS 3,773,130 11/1973 Mueller .......................... 180/250 X
4,357,840 11/1982 Winzeler .......................... 74/710 X
4,423,644 1/1984 Coutant ........................... 74/714 X
4,538,700 9/1985 Suzuki ............................. 180/249 X

FOREIGN PATENT DOCUMENTS 2139972 11/1984 United Kingdom ............... 180/248

Primary Examiner—John J. Love
Assistant Examiner—Charles R. Watts
Attorney, Agent, or Firm—Finnegan, Henderson, Farabow, Garrett & Dunner

[57] ABSTRACT

A power transmission for a four-wheel drive vehicle includes a change-speed gearing mounted within a transmission casing, and an intermediate differential unit assembled within the transmission casing and drivingly connected to an output shaft of the change-speed gearing to be applied with a driving torque through the change-speed gearing for transmitting the driving torque to a first drive shaft for front-wheel drive and to a second drive shaft for rear-wheel drive. The differential unit comprises an input member drivingly connected to the output shaft of the change-speed gearing, a plurality of planetary gear sets coaxially arranged within the transmission casing and drivingly connected to the input member, the planetary gear sets being designed to provide a plurality of drive power trains at a different gear ratio, and a shift mechanism arranged to selectively connect one of the planetary gear sets to the first and second drive shafts.

3 Claims, 5 Drawing Figures

4,650,202

POWER TRANSMISSION FOR FOUR-WHEEL DRIVE VEHICLE

BACKGROUND OF THE INVENTION

The present invention relates to a power transmission for an automotive vehicle, and more particularly to a power transmission for a four-wheel drive vehicle which includes a change-speed gearing drivingly connected to a prime mover of the vehicle to selectively establish a forward drive power train or a reverse drive power train, and an intermediate differential unit arranged to be applied with a driving torque from the prime mover through the change-speed gearing for transmitting the driving torque to a first drive shaft for front-wheel drive and to a second drive shaft for rear-wheel drive.

In conventional power transmissions of this kind, there have been adapted two kinds of intermediate differential units, one of which is the bevel gear type and the other of which is the planetary gear type. Such conventional intermediate differential units each include an input member drivingly connected to an output shaft of the change-speed gearing, and a single pair of output members arranged to be applied with a driving torque from the change-speed gearing through the input member for transmitting the driving torque to the first and second drive shafts at a predetermined gear ratio. It is, however, noted that the distribution ratio of the driving torque to the drive shafts should be changed in accordance with the road condition to ensure stable maneuverability of the vehicle. For example, if the distribution ratio of the driving torque is determined to ensure stable maneuverability of the vehicle on a road of low frictional coefficient, the vehicle will understeer on a road of high frictional coefficient. If the distribution ratio of the driving torque is determined to ensure stable maneuverability of the vehicle on a road of high frictional coefficient, traction of the vehicle will become insufficient on a road of low frictional coefficient. For this reason, an auxiliary transmission has been adapted to the intermediate differential unit to change the distribution ratio of the driving torque in accordance with the road condition. Such arrangement of the auxiliary transmission, however, results in increase of the size and weight of the power transmission assembly.

SUMMARY OF THE INVENTION

It is, therefore, a primary object of the present invention to provide an improved power transmission wherein the intermediate differential unit acts to change the distribution ratio of the driving torque in accordance with the road condition without provision of any auxiliary transmission so as to ensure stable maneuverability of the vehicle on various roads.

Another object of the present invention is to provide an improved power transmission, having the above-described characteristics, wherein the intermediate differential unit can be constructed relatively small in size.

According to the present invention, the above objects are accomplished by providing a power transmission which includes a transmission casing arranged to be secured to a cylinder block of a prime mover of the vehicle, a change-speed gearing mounted within the transmission casing and having an input shaft drivingly connected to an output shaft of the prime mover, and an intermediate differential unit assembled within the transmission casing and drivingly connected to an output shaft of the change-speed gearing to be applied with a driving torque from the prime mover through the change-speed gearing for transmitting the driving torque to a first drive shaft for front-wheel drive and to a second drive shaft for rear-wheel drive. The intermediate differential unit comprises an input member drivingly connected to the output shaft of the change-speed gearing, a plurality of planetary gear sets coaxially arranged within the transmission casing and drivingly connected to the input member, the planetary gear sets being designed to provide a plurality of drive power trains at different gear ratios, and a shift mechanism arranged to selectively connect one of the planetary gear sets to the first and second drive shafts.

BRIEF DESCRIPTION OF THE DRAWINGS

Additional objects, features and advantages of the present invention will become more readily apparent from the following detailed description of preferred embodiments thereof when taken together with the accompanying drawings, in which.

DETAILED DESCRIPTION OF THE PREFERRED EMBODIMENTS

Figure 1:
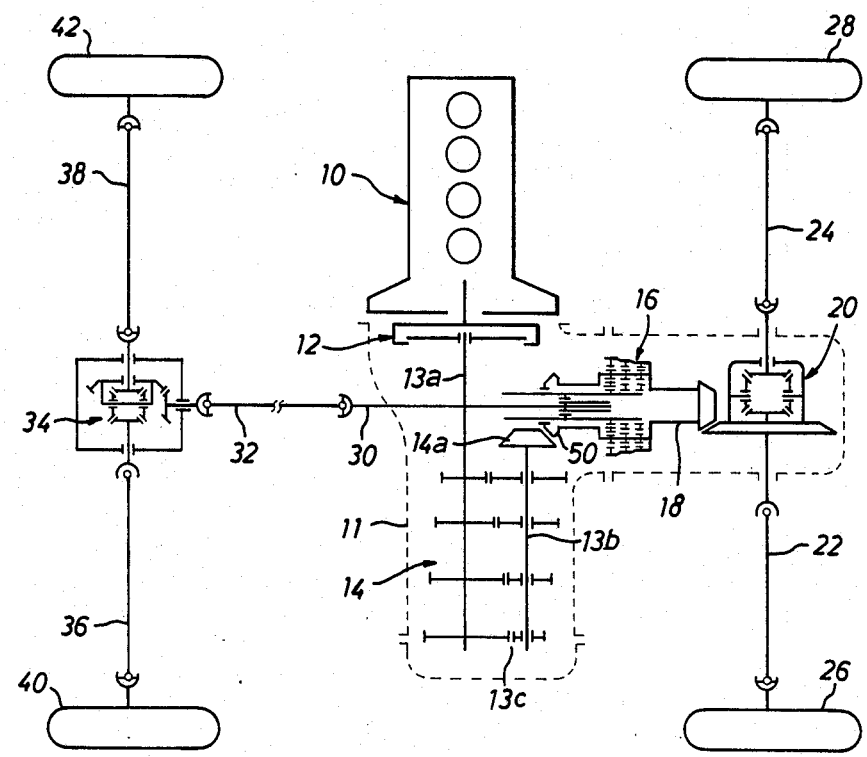
FIG. 1 is a schematic illustration of a four-wheel drive vehicle equipped with a power transmission in accordance with the present invention.

Referring now to the drawings, particularly in FIG. 1, there is schematically illustrated a four-wheel drive vehicle of the mid-ship type which is equipped with a prime mover 10 of the transversely-mounted type. A power transmission of the present invention includes a transmission casing 11 secured to the cylinder block of prime mover 10 to contain therein a clutch assembly 12, a change-speed gearing 14, an intermediate differential unit 16, and a differential unit 20 for rear-wheel drive. The change-speed gearing 14 comprises an input shaft 13a coaxially connected to an output shaft of the prime mover 10 through the clutch assembly 12, an output shaft 13b arranged in parallel with the input shaft 13a and provided thereon with an output bevel gear 14a, and change-speed gears 13c respectively mounted on the input and output shafts 13a and 13b for selectively establishing a forward drive power train or a reverse drive power train.

The intermediate differential unit 16 is assembled within the transmission casing 11 in a fore-and-aft direction of the vehicle to be applied with a driving torque from the prime mover 10 through the clutch assembly 12 and the change-speed gearing 14 for transmitting the driving torque to a first drive shaft 30 for front-wheel drive and to a second drive shaft 18 for rear-wheel drive. The first drive shaft 30 is drivingly connected to a pair of front axles 36 and 38 by way of a propeller shaft 32 and a differential unit 34 for front-wheel drive, while the second drive shaft 18 is in the form of a hollow shaft drivingly connected to a pair of rear axles 22 and 24 by way of the differential unit 20 for rear-wheel drive.

Figure 2:
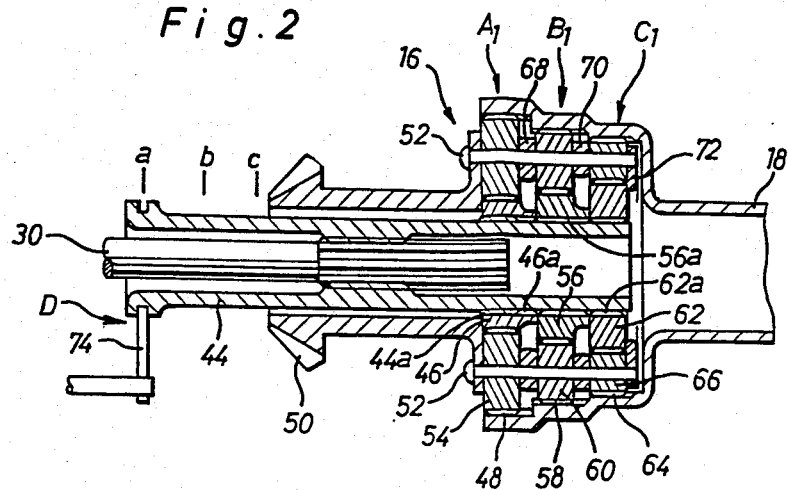
FIG. 2 is a sectional view of an intermediate differential unit assembled within the power transmission of FIG. 1.

As can be well seen in FIG. 2, the intermediate differential unit 16 comprises an input bevel gear 50 in meshing engagement with the output gear 14a of change-speed gearing 14, three kinds of planetary gear sets $A_1$, $B_1$ and $C_1$ coaxially assembled within an enlarged cylindrical portion of the second drive shaft 18 and drivingly connected to the input bevel gear 50, and a shift mechanism D arranged to selectively connect one of the planetary gear sets $A_1$–$C_1$ to the first and second drive shafts 30 and 18. The planetary gear set $A_1$ includes a sun gear 46 of small diameter rotatably mounted on a hollow slide shaft 44, a ring gear 48 of large diameter formed in the enlarged cylindrical portion of second drive shaft 18 and arranged in surrounding relationship with the sun gear 46, and a pair of planet gears 54 rotatably supported on a pair of parallel carrier pins 52 and in meshing engagement with the sun gear 46 and the ring gear 48. The hollow slide shaft 44 is axially slidably mounted on the rear end portion of first drive shaft 30 for rotation therewith and arranged within a sleeve portion of the input bevel gear 50. The sun gear 46 is formed with an internal spline 46a which is axially slidably engaged with an external spline 44a formed on the hollow slide shaft 44. The carrier pins 52 are fixed to an annular flange of input bevel gear 50.

The planetary gear set $B_1$ includes a sun gear 56 of medium diameter rotatably mounted on the hollow slide shaft 44, a ring gear 58 of medium diameter formed in the enlarged cylindrical portion of the second drive shaft 18 and arranged in surrounding relationship with the sun gear 56, and a pair of planet gears 60 rotatably supported on the carrier pins 52 and in meshing engagement with the sun gear 56 and the ring gear 58. The sun gear 56 is formed with an internal spline 56a to be axially slidably engaged with the external spline 44a of hollow slide shaft 44. The planetary gear set $C_1$ includes a sun gear 62 of large diameter rotatably mounted on the hollow slide shaft 44, a ring gear 64 of small diameter formed in the enlarge cylindrical portion of second drive shaft 18 and arranged in surrounding relationship with the sun gear 62, and a pair of planet gears 66 rotatably supported on the carrier pins 52 and in meshing engagement with the sun gear 62 and the ring gear 64. The sun gear 62 is formed with an internal spline 62a to be axially slidably engaged with the external spline 44a of hollow slide shaft 44. In such arrangement of the planetary gear sets $A_1$–$C_1$, annular spacers 68 and 70 are respectively interposed between the planet gears 54 and 60 and between the planet gears 60 and 66, and an annular end plate 72 is engaged with the sun gear 62 and the planet gear 66 and fixed to the carrier pins 52 to restrict axial movements of the sun gears 46, 56, 62 and the planet gears 54, 60, 66.

The shift mechanism D includes a shift fork 74 coupled with the front end of hollow slide shaft 44 and operatively connected through an appropriate linkage (not shown) to a manual shift lever which is arranged in the vehicle compartment to be operated by an operator. When the shift fork 74 is retained by the manual shift lever in a first position a, the hollow slide shaft 44 is engaged at its external spline 44a with the internal spline 46a of sun gear 46 and disengaged from the sun gears 56 and 62 to permit free rotation of them. When the shift fork 74 is shifted by the manual shift lever to a second position b, the hollow slide shaft 44 is engaged at its external spline 44a with the internal spline 56a of sun gear 56 and disengaged from the sun gears 46 and 62 to permit free rotation of them. When the shift fork 74 is further shifted by the manual shift lever to a third position c, the hollow slide shaft 44 is engaged at its external spline 44a with the internal spline 62a of sun gear 62 and disengaged from the sun gears 46 and 56.

Assuming that the shift fork 74 is retained in the first position a during operation of the power transmission, the input bevel gear 50 is applied with a driving torque from the output bevel gear 14a of change-speed gearing 14, and in turn, the planet gear 54 acts to transmit the driving torque to the sun gear 46 and the ring gear 48 at a distribution ratio defined by the pitch circle radiuses thereof. The driving torque applied to sun gear 46 is transmitted to the first drive shaft 30 through the hollow slide shaft 44, while the driving torque applied to ring gear 48 is transmitted to the second drive shaft 18. When the shift fork 74 is shifted to the second position b, the planet gear 60 acts to transmit the driving torque from the change-speed gearing 14 to the sun gear 56 and the ring gear 58 at a distribution ratio defined by the pitch circle radiuses thereof. In this instance, the driving torque applied to the first drive shaft 30 is increased more than that in the first position of shift fork 74 because the pitch circle radius of sun gear 56 is larger than that of sun gear 46 and the pitch circle radius of ring gear 58 is smaller than that of the ring gear 48. When the shift fork 74 is further shifted to the third position c, the planet gear 66 acts to transmit the driving torque from the change-speed gearing 14 to the sun gear 62 and the ring gear 64 at a distribution ratio defined by the pitch circle radiuses thereof. In this instance, the driving torque applied to the first drive shaft 30 is further increased more than that in the second position of shift fork 74 because the pitch circle radius of sun gear 62 is larger than that of sun gear 56 and the pitch circle radius of ring gear 64 is smaller than that of ring gear 58.

From the above description, it will be understood that the intermediate differential unit 16 acts to change the distribution ratio of the driving torque in three steps in accordance with the road condition so as to ensure stable maneuverability of the vehicle. Furthermore, it will be understood that with the above arrangement of the planetary gear sets $A_1$–$C_1$ and the shift mechanism D, the power transmission can be constructed relatively small in size and weight to be installed in a limited space of the vehicle.

Figure 3:
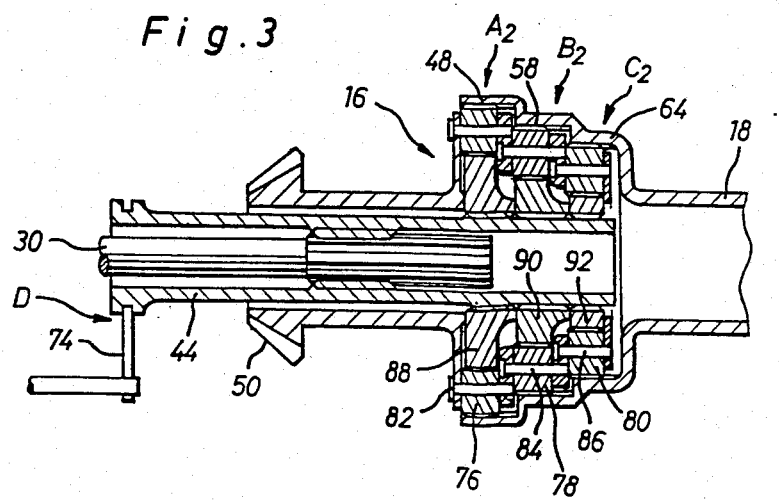
FIG. 3 is a sectional view of a modification of the intermediate differential unit of FIG. 2.

In FIG. 3, there is illustrated a modification of the intermediate differential unit 16, wherein the planetary gear sets $A_1$–$C_1$ are replaced with three kinds of planetary gear sets $A_2$–$C_2$. In this modification, respective planet gears 76, 78, 80 of the planetary gear sets $A_2$–$C_2$ are common in size and connected to the annular flange of input bevel gear 50 by means of same carrier pins 82, 84, 86. In addition, sun gears 88, 90, 92 of the planetary gear sets $A_2$–$C_2$ are formed successively small in pitch circle radius. The other construction of the modification is substantially the same as that of the intermediate differential unit 16 shown in FIG. 2. With such arrangement of the planetary gear sets $A_2$–$C_2$, each assembly of the planet gears 76, 78, 80 can be made by common parts.

Figure 4:
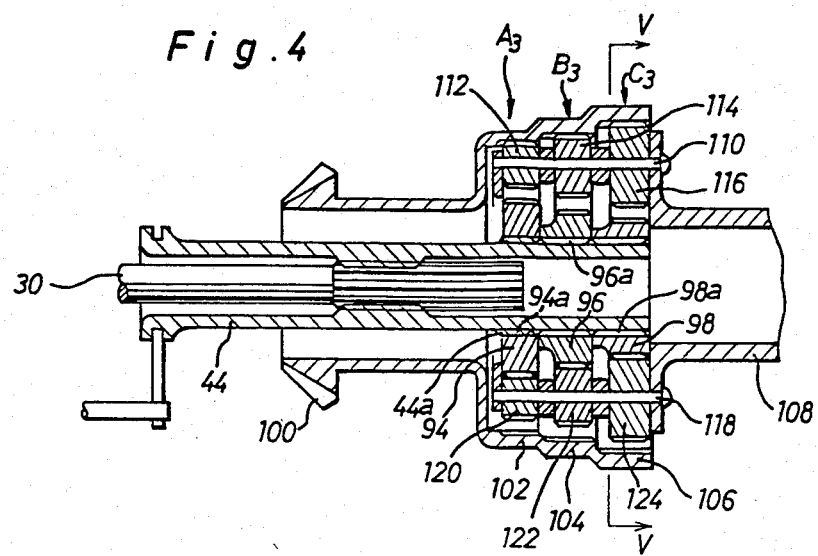
FIG. 4 is a sectional view of another modification of the intermediate differential unit of FIG. 2.
Figure 5:
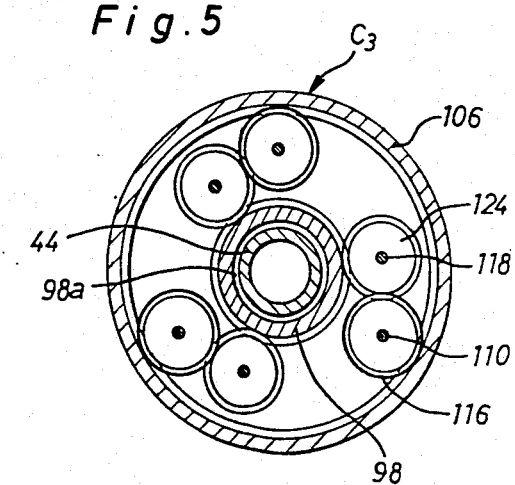
FIG. 5 is a cross-sectional view taken along line V—V in FIG. 4.

In FIG. 4, there is illustrated another modification of the intermediate differential unit 16, wherein the planetary gear sets $A_1$–$C_1$ of FIG. 2 are replaced with three kinds of planetary gear sets $A_3$–$C_3$ which are coaxially assembled within an enlarged cylindrical portion of an input bevel gear 100. In this modification, the planetary gear set A3 includes a sun gear 94 of large diameter rotatably mounted on the hollow slide shaft 44, a ring gear 102 of small diameter formed in the enlarged cylindrical portion of input bevel gear 100 and arranged in surrounding relationship with the sun gear 94, a first planet gear 112 of small diameter rotatably supported on a carrier pin 110 and in meshing engagement with the ring gear 102, and a second planet gear 120 of small diameter rotatably supported on a carrier pin 118 and in meshing engagement with the first planet gear 112 and the sun gear 94. The carrier pins 110 and 118 are fixed to an annular flange of a drive shaft 108 which corresponds with the second drive shaft 18 for rear-wheel drive.

The planetary gear set B3 includes a sun gear 96 of medium diameter rotatably mounted on the hollow slide shaft 44, a ring gear 104 of medium diameter formed in the enlarged cylindrical portion of input bevel gear 100 and arranged in surrounding relationship with the sun gear 96, a first planet gear 114 of medium diameter rotatably supported on the carrier pin 110 and in meshing engagement with the ring gear 104, and a second planet gear 122 of medium diameter rotatably supported on the carrier pin 118 and meshing engagement with the first planet gear 114 and the sun gear 96. The planetary gear set C3 includes a sun gear 98 of small diameter rotatably mounted on the hollow slide shaft 44, a ring gear 106 of large diameter formed in the enlarged cylindrical portion of input bevel gear 100 and arranged in surrrounding relationship with the sun gear 98, a first planet gear 116 of large diameter rotatably supported on the carrier pin 110 and meshing engagement with the ring gear 106, and a second planet gear 124 of large diameter rotatably supported on the carrier pin 118 and meshing engagement with the first planet gear 116 and the sun gear 98. In such arrangement of the planetary gear sets $A_3$-$C_3$, the input bevel gear 100 is applied with a driving torque from the output bevel gear 14a of change-speed gearing 14, and in turn, each of the ring gears 102, 104, 106 acts to transmit the driving torque to each of the sun gears and each of the carrier pins through each of the planet gears.

Although certain specific embodiments of the present invention have been shown and described, it is obvious that many modifications and variations thereof are possible in light of these teachings. It is to be understood, therefore, that within the scope of the appended claims, the invention may be practiced otherwise than as specifically described herein.

What is claimed is:

1. A power transmission for a vehicle having front and rear wheel drive and a prime mover, said transmission comprising:
   a change-speed gearing operatively disposed in a transmission casing secured to said prime mover, said gearing including an input shaft drivingly connected to said prime mover, and an output shaft drivingly connected to said input shaft;
   a first drive shaft drivingly connected to said front wheels;
   a second drive shaft coaxial with said first drive shaft and drivingly connected to said rear wheels; and
   an intermediate differential unit drivingly interconnecting said output shaft and said first and second drive shafts, said differential unit comprising:
   an input gear coaxially surrounding said first drive shaft and drivingly connected to said output shaft;
   a plurality of coaxial planetary gear sets providing a plurality of drive power trains at different gear ratios, each said gear set including sun, planet and ring gears, said gear sets being drivingly connected to one of said input gear and second drive shaft, and a portion of the other of said input gear and second drive shaft coaxially surrounding and defining the ring gears of said gear sets; and
   means drivingly connectd to said first drive shaft for selectively engaging one of said gear sets into driving connection with said first and second drive shafts.

2. The power transmission of claim 1 wherein said engaging means comprises a hollow slide shaft coaxially disposed in said input gear and coaxially splined to said first drive shaft for axial movement, said slide shaft including spline means for drivingly engaging a selective one of said gear sets and actuation means for axially moving said slide shaft to shift said spline means into engagement with a selected one of said gear sets.

3. The power transmission of claim 1 wherein said coaxial first and second drive shafts are oriented in a fore-and-aft direction of said vehicle.

* * * * *